US010002475B2

(12) United States Patent
Krishnan et al.

(10) Patent No.: US 10,002,475 B2
(45) Date of Patent: Jun. 19, 2018

(54) INTRUSION SECURITY DEVICE WITH SMS BASED NOTIFICATION AND CONTROL

(71) Applicant: CARRIER CORPORATION, Jupiter, FL (US)

(72) Inventors: Anantha Krishnan, Hyderabad (IN); Michael Ramoutar, Westford, MA (US); Prakash Bodla, Hyderabad (IN); Sunilkumar Neckaraje, Hyderabad (IN)

(73) Assignee: Carrier Corporation, Palm Beach Gardens, FL (US)

( * ) Notice: Subject to any disclaimer, the term of this patent is extended or adjusted under 35 U.S.C. 154(b) by 0 days. days.

(21) Appl. No.: 15/245,742

(22) Filed: Aug. 24, 2016

(65) Prior Publication Data

US 2017/0061713 A1  Mar. 2, 2017

Related U.S. Application Data

(60) Provisional application No. 62/210,512, filed on Aug. 27, 2015.

(51) Int. Cl.
| | |
|---|---|
| G07C 9/00 | (2006.01) |
| G06F 21/31 | (2013.01) |
| G08B 25/14 | (2006.01) |
| H04L 12/28 | (2006.01) |
| H04L 29/06 | (2006.01) |

(Continued)

(52) U.S. Cl.
CPC ......... *G07C 9/00039* (2013.01); *G06F 21/31* (2013.01); *G07C 9/00* (2013.01); *G08B 25/14* (2013.01); *H04L 12/2803* (2013.01); *H04L 63/0853* (2013.01); *H04L 63/107* (2013.01); *H04W 12/06* (2013.01); *G08B 25/008* (2013.01)

(58) Field of Classification Search
CPC ....... G07C 9/00039; G07C 9/00; G06F 21/31; G08B 25/14; H04L 12/2803; H04L 63/0853; H04L 63/107; H04W 12/06
See application file for complete search history.

(56) References Cited

U.S. PATENT DOCUMENTS

| | | | |
|---|---|---|---|
| 7,240,037 B1 * | 7/2007 | Bussell | G06Q 20/401 101/71 |
| 8,854,187 B2 | 10/2014 | Motta | |
| 9,075,979 B1 | 7/2015 | Queru | |

(Continued)

FOREIGN PATENT DOCUMENTS

| | | |
|---|---|---|
| CN | 200959170 Y | 10/2007 |
| CN | 202970352 U | 6/2013 |

(Continued)

OTHER PUBLICATIONS

European extended search report dated Nov. 16, 2016, in connection with European patent application No. 16185955.8.

(Continued)

*Primary Examiner* — Leon Flores
(74) *Attorney, Agent, or Firm* — Bachman & LaPointe, P.C.

(57) ABSTRACT

A security system includes a security device with at least two factors of authentication. A method of operating a security system including displaying a pseudo code screen prior to display of an actual access code screen, the pseudo code screen identical to the actual access code screen.

31 Claims, 9 Drawing Sheets

(51) Int. Cl.
*H04W 12/06* (2009.01)
*G08B 25/00* (2006.01)

(56) References Cited

U.S. PATENT DOCUMENTS

| | | | |
|---|---|---|---|
| 9,294,476 B1* | 3/2016 | Lurey | .............. H04L 63/0861 |
| 2007/0182543 A1 | 8/2007 | Luo | |
| 2008/0296912 A1 | 12/2008 | Whitner et al. | |
| 2009/0083828 A1 | 3/2009 | Romanczyk et al. | |
| 2011/0149078 A1 | 6/2011 | Fan et al. | |
| 2013/0262873 A1* | 10/2013 | Read | .................. H04W 12/06 |
| | | | 713/186 |
| 2014/0059347 A1 | 2/2014 | Dougherty et al. | |
| 2014/0173289 A1 | 6/2014 | Casilli | |
| 2015/0229626 A1 | 8/2015 | Hauhn | |

FOREIGN PATENT DOCUMENTS

| | | |
|---|---|---|
| CN | 203706291 U | 7/2014 |
| CN | 104658065 A | 5/2015 |
| KR | 20030009929 A | 2/2003 |

OTHER PUBLICATIONS

Pratiksha Misal, Madhura Karule, Dhanshree Birdawade, Anjali Deshmukh, Mrunal Pathak, Door Locking/Unlocking System Using SMS Technology With GSM/GPRS Services, Department of Information Technology, University of Pune, India, Apr. 5-6, 2014.

Sheikh I. Azid and Bibhya Sharma, Intelligent Home: SMS Based Home Security System With Immediate Feedback, World Academy of Science, Engineering and Technology, International Journal of Electrical, Computer, Energetic, Electronic and Communication Engineering, vol. 6, No. 12, 2012.

Mohammad Amanullah, Microcontroller Based Reprogrammable Digital Door Lock Security System by Using Keypad & GSM/CDMA Technology, IOSR Journal of Electrical and Electronics Engineering (IOSR-JEEE), e-ISSN: 2278-1676 vol. 4, Issue 6, Mar.-Apr. 2013, pp. 38-42, www.iosrjournals.org.

Home Alarm System With LCD Display & Keypad Programmable, Information Unlimited, 2016.

Remote Monitoring GSM/SMS Communicating Wireless Alarm System, Response Electronics Limited, 2016.

* cited by examiner

INTRUSION SECURITY DEVICE WITH SMS BASED NOTIFICATION AND CONTROL

CROSS REFERENCE TO RELATED APPLICATION

This application claims the benefit of provisional application Ser. No. 62/210,512, filed Aug. 27, 2015.

BACKGROUND

The present disclosure relates to a security system and, more particularly, to a security system that pairs an intrusion security device with a mobile device to facilitate SMS based notification and control.

Intrusion security panels are electronic control devices that are primarily used to supervise residence and, office premises to report access events to a user and/or monitoring stations. These control panels are usually governed by relatively "simple to use" 4-10 digit access codes. The authorized user can thus readily enter the access code to disarm the system and disables all the sensors that report to the security panel.

SUMMARY

A security system according to one disclosed non-limiting embodiment of the present disclosure can include a security device with at least two factors of authentication.

A further embodiment of the present disclosure may include, wherein at least one factor of authentication includes proximity between the security device and an authorized mobile device.

A further embodiment of any of the embodiments of the present disclosure may include, wherein at least one factor of authentication includes a communication between the security device and an authorized mobile device.

A further embodiment of any of the embodiments of the present disclosure may include, wherein the communication between the security device and the authorized mobile device includes a fingerprint to the authorized mobile device.

A further embodiment of any of the embodiments of the present disclosure may include, wherein the communication between the security device and the authorized mobile device includes a voiceprint to the authorized mobile device.

A further embodiment of any of the embodiments of the present disclosure may include, wherein at least one factor of authentication includes a SMS between the security device and an authorized mobile device.

A further embodiment of any of the embodiments of the present disclosure may include, wherein at least one factor of authentication includes a SMS from an authorized mobile device to a security device.

A further embodiment of any of the embodiments of the present disclosure may include, wherein at least one factor of authentication includes display of a the pseudo code screen prior to display of an actual access code screen.

A further embodiment of any of the embodiments of the present disclosure may include, wherein the pseudo code screen identical to the actual access code screen.

A further embodiment of any of the embodiments of the present disclosure may include, wherein the pseudo code screen requires entry of a pseudo code for display of the actual access code screen.

A further embodiment of any of the embodiments of the present disclosure may include, wherein the pseudo code has a different digit count compared to the access code.

A further embodiment of any of the embodiments of the present disclosure may include, wherein the entry of the access code to the actual access code screen is required to disarm the security system.

A further embodiment of any of the embodiments of the present disclosure may include a security panel including an input device, the input device in communication with the security device.

A method of operating a security system, the method according to another disclosed non-limiting embodiment of the present disclosure can include displaying a pseudo code screen on a security device prior to display of an actual access code screen.

A further embodiment of any of the embodiments of the present disclosure may include, wherein the pseudo code screen is identical to the actual access code screen.

A further embodiment of any of the embodiments of the present disclosure may include displaying the actual access code screen in response to an authorized mobile device being within a predefined proximity to a security device.

A further embodiment of any of the embodiments of the present disclosure may include displaying the actual access code screen in response to a SMS from an authorized mobile device.

A further embodiment of any of the embodiments of the present disclosure may include requiring entering a pseudo code to the pseudo code screen to display of the actual access code screen A further embodiment of any of the embodiments of the present disclosure may include, wherein the pseudo code has a different digit number compared to the access code.

A further embodiment of any of the embodiments of the present disclosure may include communicating with an authorized mobile device or central monitoring station in response to a predetermined number of incorrect entries into the pseudo code screen.

A further embodiment of any of the embodiments of the present disclosure may include communicating with the authorized mobile device or central monitoring station via SMS.

A further embodiment of any of the embodiments of the present disclosure may include communicating information related to the security device to the authorized mobile device A further embodiment of any of the embodiments of the present disclosure may include communicating a temporary access code to the authorized mobile device.

A further embodiment of any of the embodiments of the present disclosure may include displaying a secret question screen in response to entry of the temporary access code.

A further embodiment of any of the embodiments of the present disclosure may include disabling the security device in response to an incorrect entry to the secret question screen.

A further embodiment of any of the embodiments of the present disclosure may include displaying the actual access code screen in response to an authorized mobile device being within a predefined proximity to a security device, the predefined proximity determined by GPS.

A further embodiment of any of the embodiments of the present disclosure may include displaying the actual access code screen in response to an authorized mobile device being within a predefined proximity to a security device, the predefined proximity determined by triangulation.

A further embodiment of any of the embodiments of the present disclosure may include displaying the actual access code screen in response to an authorized mobile device being within a predefined proximity to a security device, the predefined proximity determined from a periodic poll from the mobile device.

A further embodiment of any of the embodiments of the present disclosure may include displaying the actual access code screen in response to an authorized mobile device being within a predefined proximity to a security device, then displaying the actual access code screen in response to a xml-based communication from the mobile device.

The foregoing features and elements may be combined in various combinations without exclusivity, unless expressly indicated otherwise. These features and elements as well as the operation thereof will become more apparent in light of the following description and the accompanying drawings. It should be appreciated, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
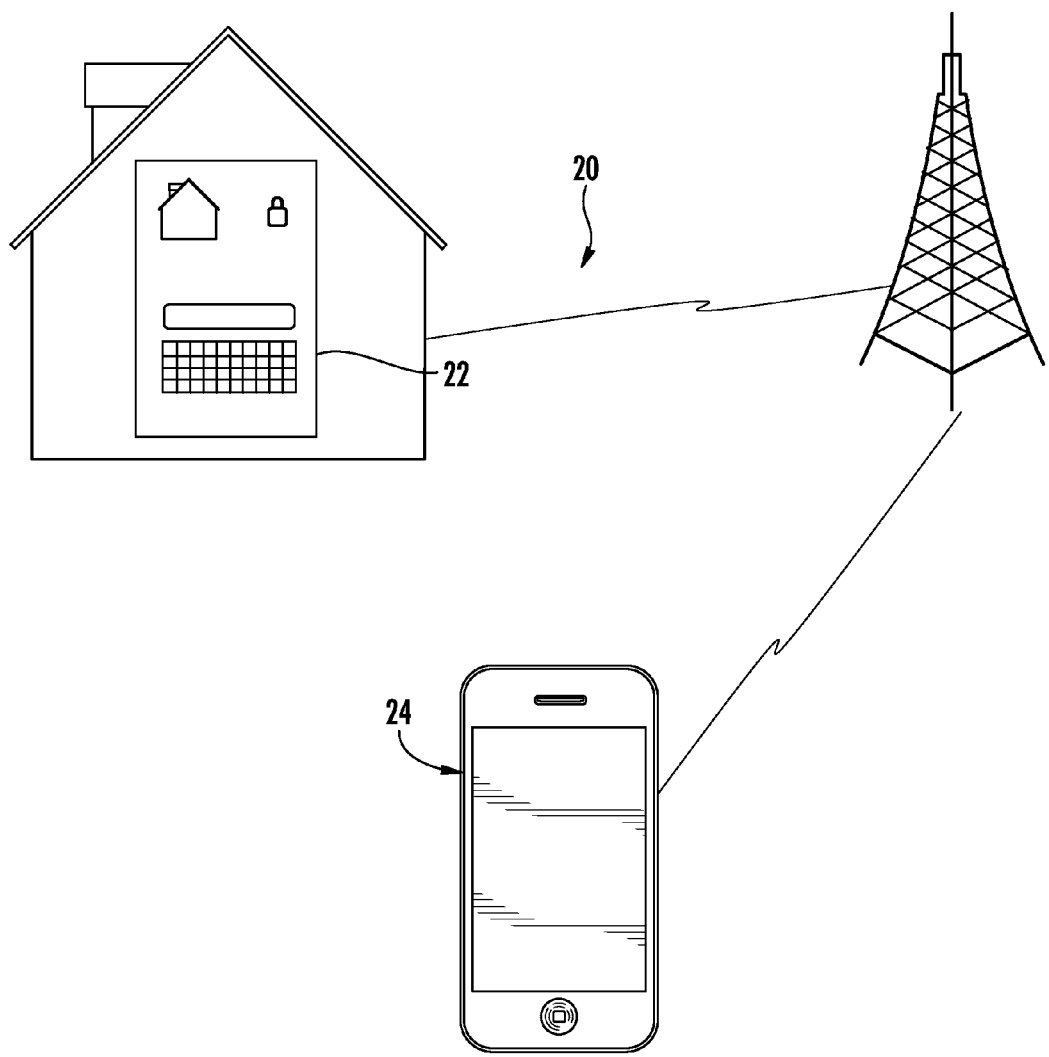
FIG. 1 is a schematic view of a security system according to one disclosed non-limiting embodiment.

FIG. 1 schematically illustrates a security system 20. The security system 20 generally includes a security device 22 and one or more mobile devices 24, e.g. a smartphone, in communication with the security device 22 such as via Short Message Service (SMS). It should be appreciated that the security device 22 may be a security panel or form a portion thereof. SMS is a text messaging service component for phone, Web, or mobile communication systems that facilitates exchange of short text messages. It should be still further appreciated that although particular systems are separately defined, each or any of the systems may be otherwise combined or separated via hardware and/or software. The communication may be conveyed to one or more networks. For example, the communication may be transmitted to the Internet and/or a cellular network. The network(s) may include infrastructure that may be organized to facilitate cloud computing. For example, cloud computing may include one or more servers, such as a primary message server, a backup message server, etc.

The servers may be configured to process communications from the mobile device 24. As part of the processing, the servers may validate or authenticate the mobile device 24 and/or a user, potentially based on an identifier associated with the authorized user or the mobile device 24. The validation may alternatively or additionally be based on a location of the authorized user or the mobile device 24. The location may be determined based on one or more location-based services or techniques, such as triangulation, global positioning system (GPS), etc.

Figure 2:
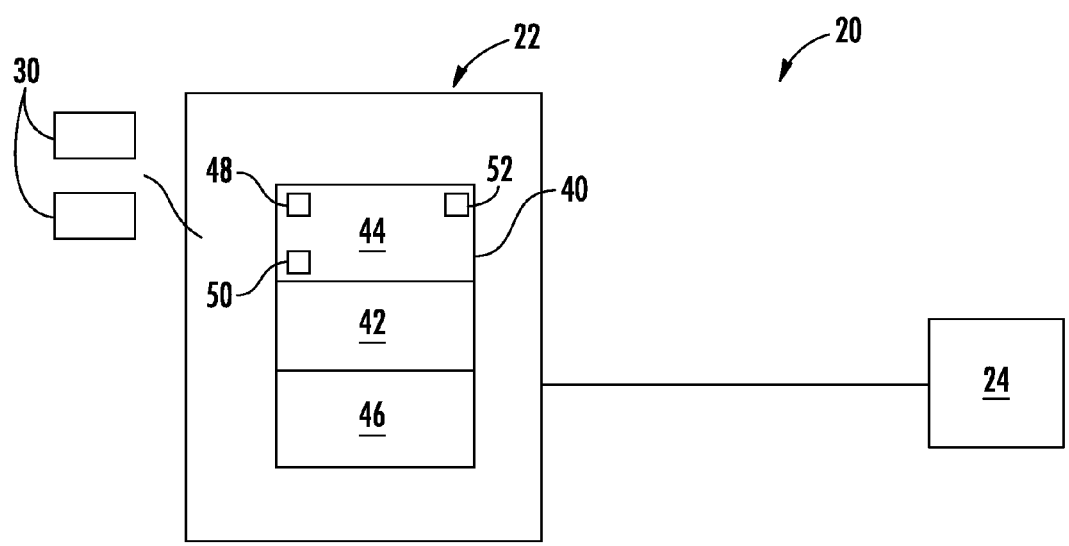
FIG. 2 is a block diagram of the security system.
Figure 3:
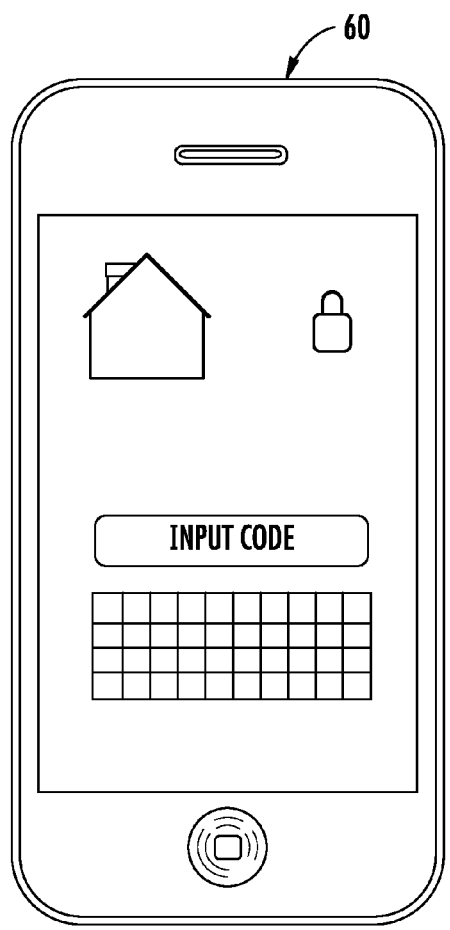
FIG. 3 is a schematic view of a pseudo access code screen identical to an actual access code screen for operation of the security system according one disclosed non-limiting embodiment.
Figure 4:
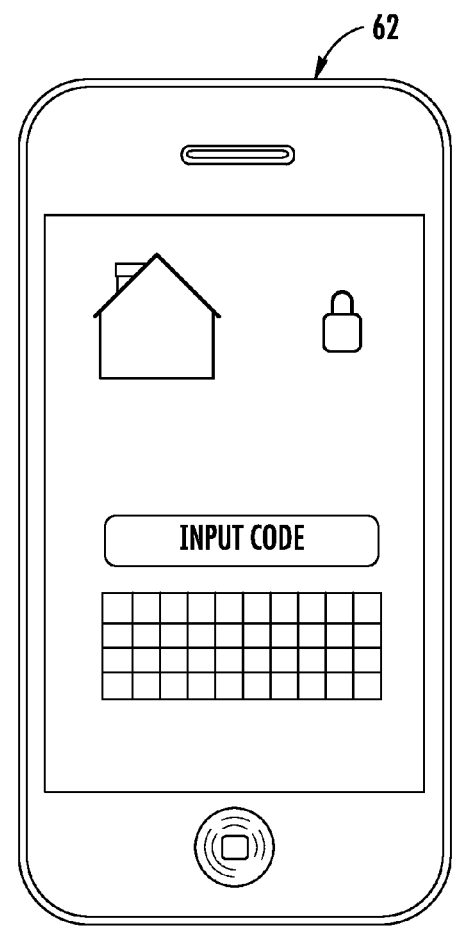
FIG. 4 is a schematic view of an actual access code screen identical to the pseudo access code screen for operation of the security system according to one disclosed non-limiting embodiment.

With reference to FIG. 2, the security device 22 generally includes a control module 40 with a processor 42, a memory 44, and an interface 46. The processor 42 may be any type of microprocessor having desired performance characteristics. The memory 44 may include any type of computer readable medium that stores the data and executable instructions 48 described herein below. The executable instructions may be stored or organized in any manner and at any level of abstraction, such as in connection with one or more applications 48, processes, routines, procedures, methods, etc. The memory 44 may also store data 50 that, for example, includes an access code validation engine 52, a device identifier, or any other type of data. The access code validation engine 52 is the authorization code that disables sensors 30 reporting to the security device 22 to disarm the security system 20. The processor 42 may execute the instructions stored in the memory 44 that are operative on the data 50. The processor 42 may be coupled to the interface 46 that may include one or more of a keyboard or keypad, a touchscreen or touch panel, a display screen, a microphone, a speaker, etc. The interface 46 may also support a graphical user interface (GUI) and/or voice-to-text capabilities. The interface 46 and/or the mobile device 24 is operable to display a pseudo access code screen 60 (FIG. 3) that is identical to an actual access code screen 62 (FIG. 4) but is not in communication with the security device 22 access code validation engine 52. That is, the security device 22 and/or the mobile device 24 may display the pseudo access code screen 60 and the actual access code screen 62 to receive an access code for further interaction with the security system 20.

When the pseudo access code screen 60 is displayed, a user may not be able to distinguish the pseudo access code screen 60 from the actual access code screen 62 and any correct/incorrect access code entered on the pseudo access code screen 60 will result in a failure. For an intruder the pseudo access code screen 60 will be seen as the access code screen and any of a brute force attack, a correct access code which was shoulder tapped, and/or an access code crack will not permit the intruder to break into the security control panel 22. As will be further described below, the authorized user can access the actual access code screen 62 via proximity between the security device 22 and the one or more authorized mobile devices 24, via SMS communication between the security device 22 and the one or more authorized mobile devices 24, specific Bluetooth/NFC based authentication token, and/or other such authentication factor.

Figure 5:
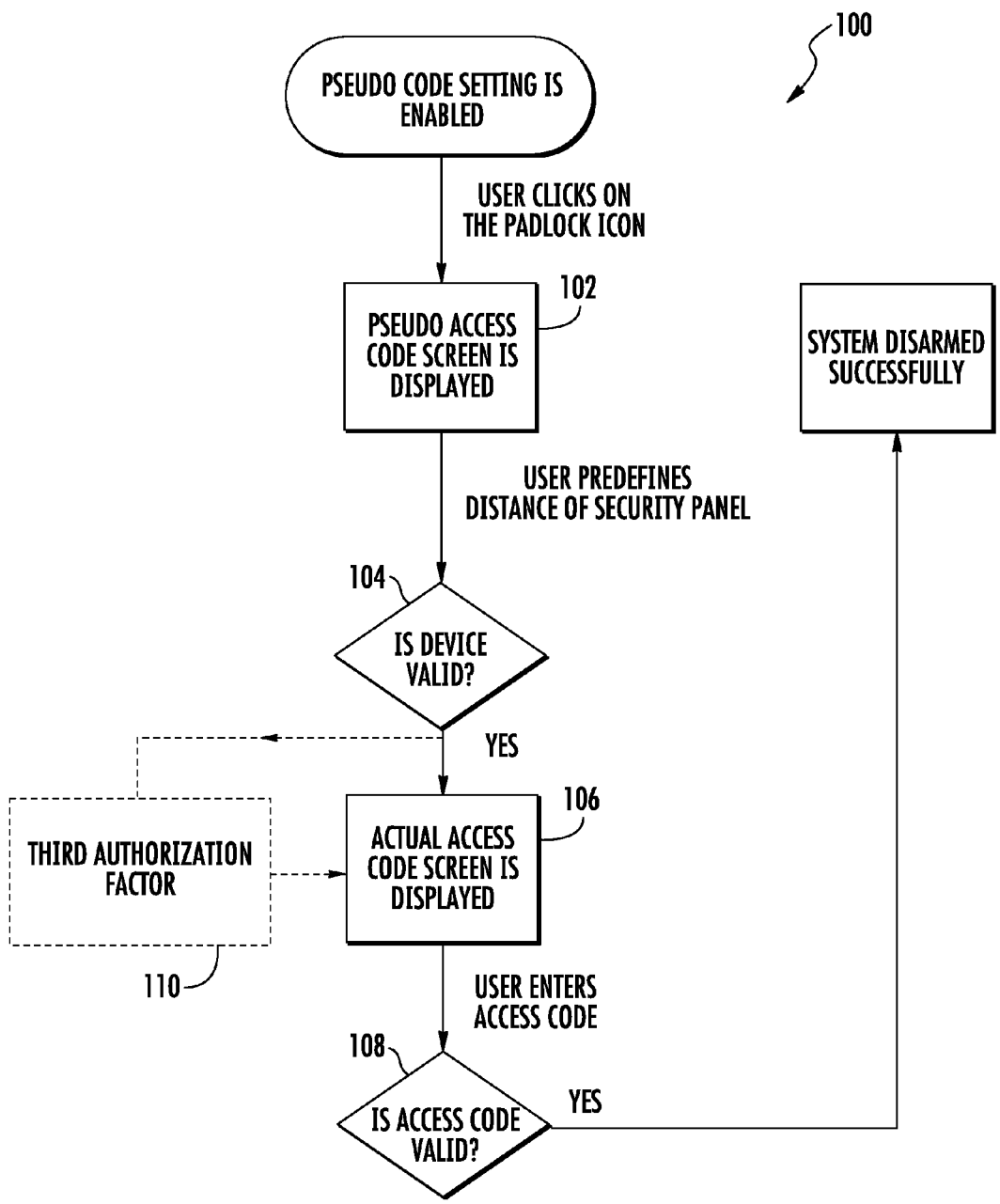
FIG. 5 is a block diagram for an operational use case of the security system according to one disclosed non-limiting embodiment.

With reference to FIG. 5, a method 100 for operation of the security system 20 is disclosed in terms of functional block diagrams. It should be appreciated that these functions may be enacted in either dedicated hardware circuitry or programmed software routines capable of execution in various microprocessor based electronics control embodiments.

In one embodiment, the pseudo access code screen 60 is displayed (step 102) until the one or more authorized mobile devices 24 are within proximity to the security device 22 (step 104). That is, proximity to the security device 22 may be predefined as a threshold distance directly adjacent to the security device 22. Predefined proximity to the security device 22 can be further determined by GPS, Triangulation, or from a Periodic poll from the smartphone application from authorized user mobile. Once the mobile device is in proximity, the smartphone/mobile app live/installed in the authorized user mobile can send an xml-based communication (different from SMS communication) to the security panel to get access to the actual access code screen.

Once the security device 22 detects the authorized mobile device 24 (step 104), the actual access code screen 62 is displayed (step 106) such that the authorized user may enter the access code to disarm the system 20 (step 108). That is, detection of the authorized mobile device 24 is the first authentication factor, and entry of the access code to disarm the system 20 is a second authentication factor.

Alternatively, or in addition, a third authentication factor may be utilized (step 110). In one example of a third authentication factor, the authorized user can send an SMS from the authorized mobile device 24 to the security device 22 while proximate the security device 22 to access the actual access code screen 62. Alternatively, or in addition, the third authentication factor may beneficially utilize security features built in to the mobile device 24 such as a fingerprint scan, voice print, etc. Such a third authentication factor obviates the use of a stolen mobile device 24, as even with the stolen mobile device 24, the intruder cannot enter the proper third authentication factor, e.g., fingerprint scan, voice print, etc.

Figure 6:
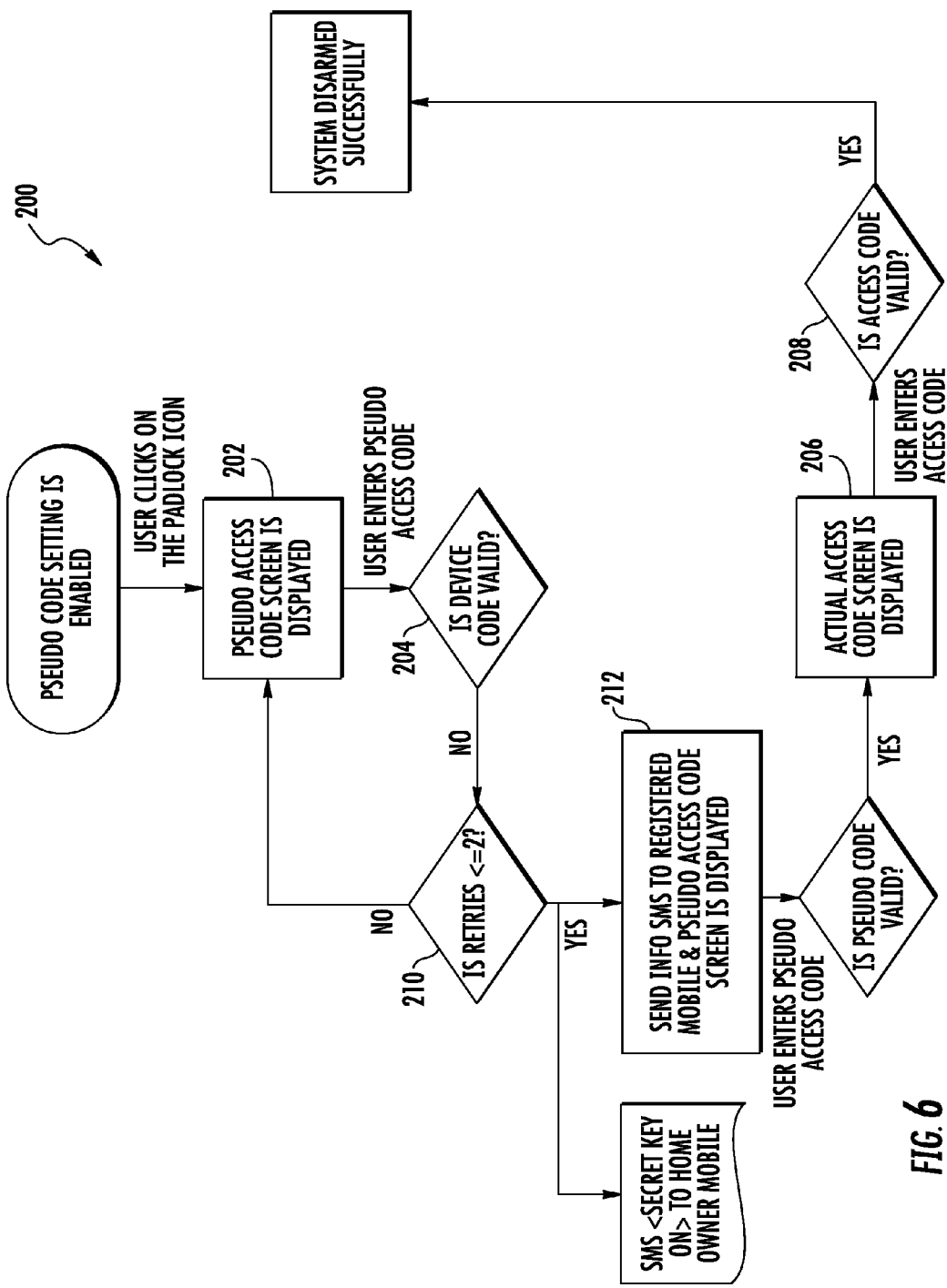
FIG. 6 is a block diagram for an operational use case of the security system according to one disclosed non-limiting embodiment.

With reference to FIG. 6, in another embodiment, a method 200 for operation of the security system 20 displays the pseudo code screen 60 (step 202) and requires the entry of a pseudo code, which is different from the access code utilized for the actual access code screen 62 (step 204). The authorized user has to enter the pseudo code in the pseudo access code screen 60 to reveal the actual access code screen 62. The pseudo access code screen 60 may be identical to the actual access code screen 62, so the intruder will be unable to recognize the difference between the pseudo access code screen 60 and actual access code screen 62. Since the authorized user has enabled this setting, the authorized user is aware that the pseudo access code screen 60 is displayed, but for the intruder it will look like the actual access code screen.

Once the pseudo code has been entered, the actual access code screen 62 is displayed (step 206) such that the authorized user may enter the access code to disarm the system 20 (step 208). It should be appreciated that the third authentication factor might also be utilized in this embodiment.

Figure 7:
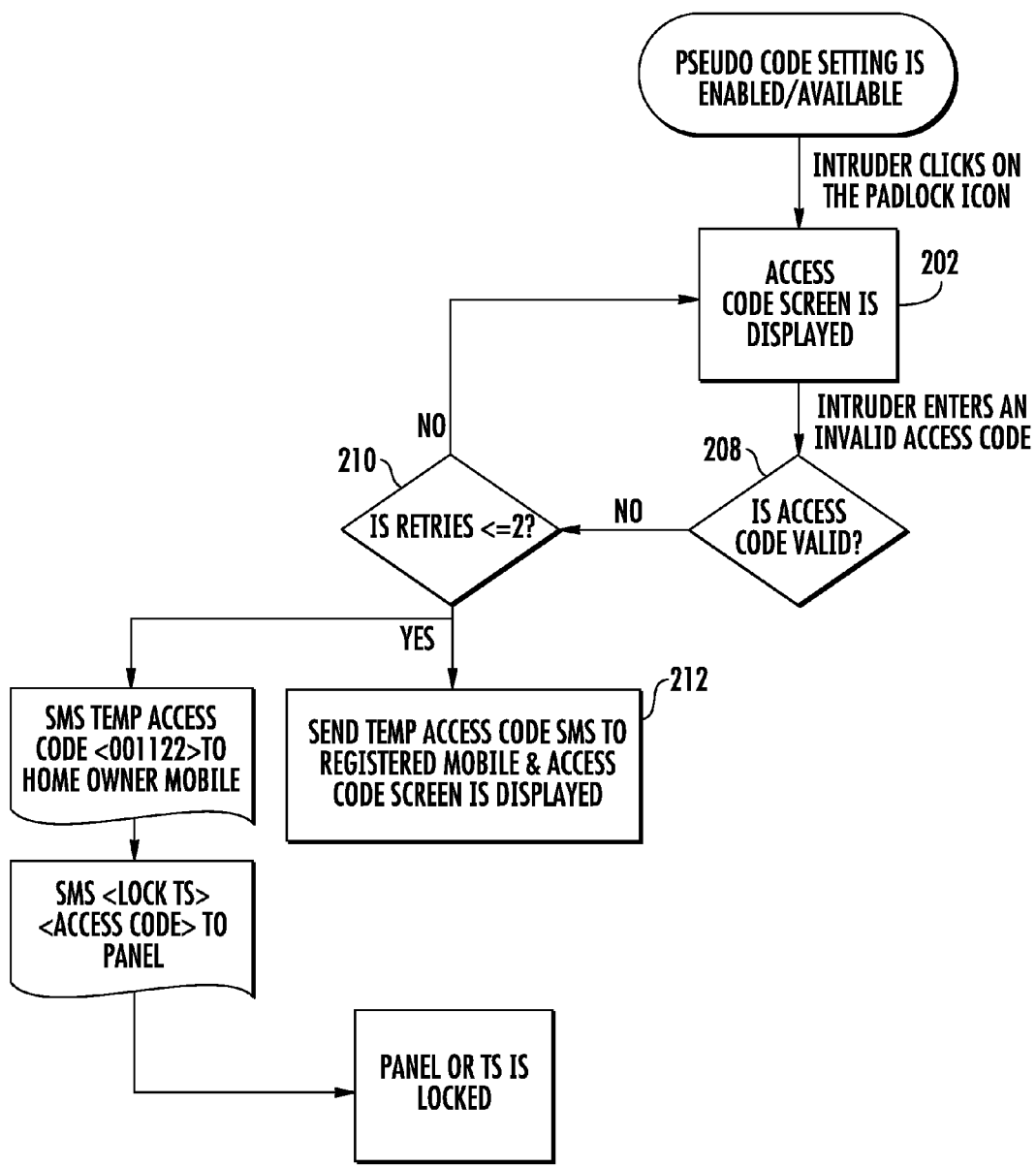
FIG. 7 is a block diagram for an operational use case of the security system according to one disclosed non-limiting embodiment.

Should an intruder enter the access code to the pseudo access code screen 60, the security device 22 may just display a message, for example, "Invalid Access Code, Please Try Again." Since the pseudo access code screen 60 is displaced, whatever the intruder enters—even the correct access code—results in the same message. The intruder will thus be unable to break into the security system 20 with any number of attempts. Further, after a predefined number of wrong attempts (step 210), the authorized user will be notified with SMS to the one or more authorized mobile devices 24 (step 212) to alert the authorized user and/or central monitoring station that an unauthorized access has been attempted. The authorized user or central monitoring station may then access the security device 22 remotely via SMS to, for example, lock the security device 22, alert authorities, trigger an alarm, etc. (FIG. 7). Alternatively, the security device 22 may be locked, alert authorities, trigger an alarm, etc., in response to a predetermined number of incorrect attempts.

In this embodiment, the authorized user may selectively enable and disable the pseudo code setting, for example, when the authorized user is traveling out of town, while on normal days, the pseudo code setting can be disabled to avoid the necessity of always entering the two codes. Further, the pseudo access code may be a relatively simple derivative of the actual access code, for example, if the access code is "1234," then the pseudo code can be "123" or "12345," or other code which can be configured by the authorized user. In this example, the pseudo code will have a different digit count than the actual access code and thus be different than the actual access code, to avoid accidental access should the intruder try the 4 digit "1234" on the pseudo code screen 60 and then enter the actual access code screen 62 such that if the intruder enters "1234" believing the first entry failed, the intruder has then disabled the system, that is, inadvertently bypassed the pseudo code screen 60.

Figure 8:
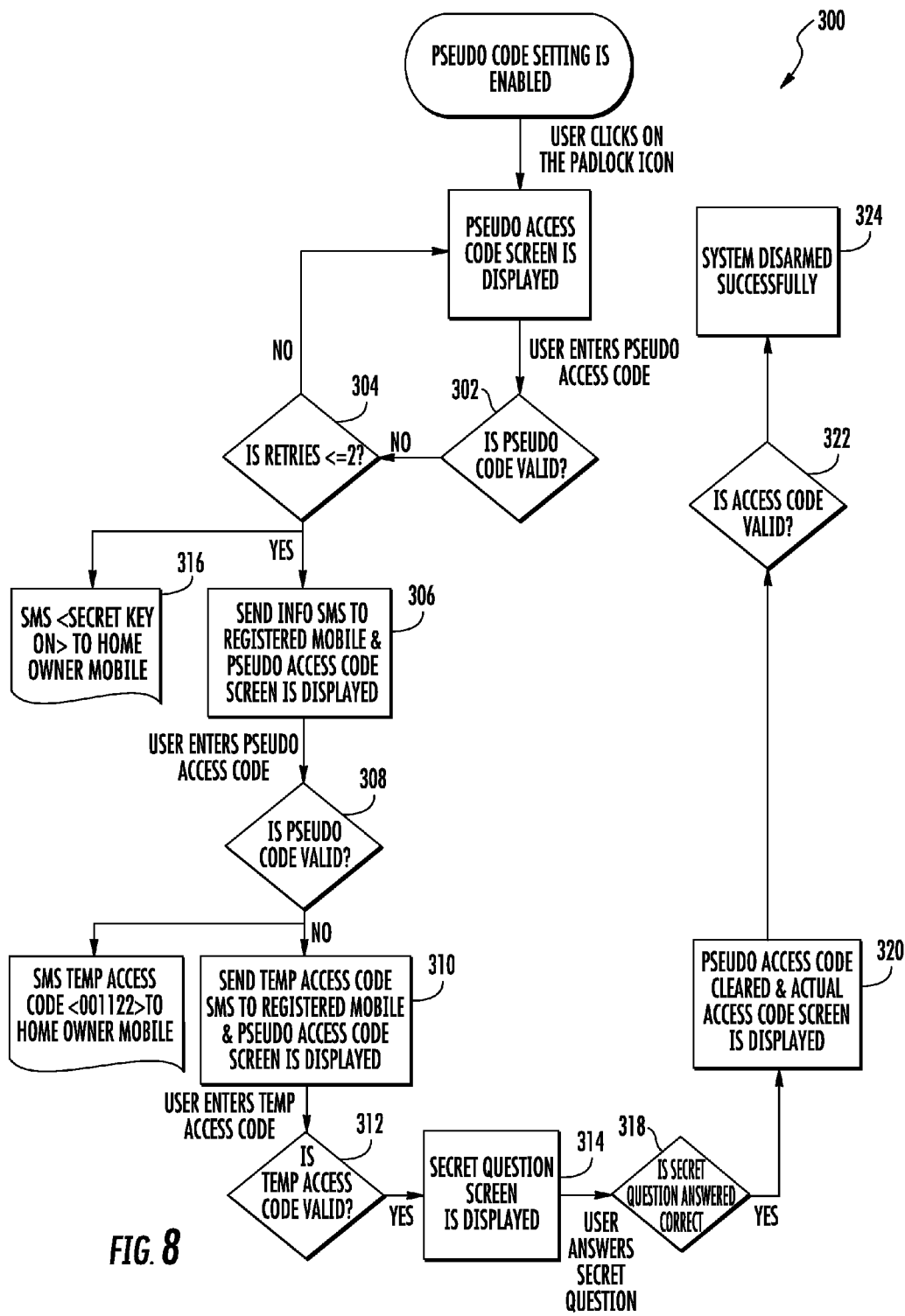
FIG. 8 is a block diagram for an operational use case of the security system according to one disclosed non-limiting embodiment.

With reference to FIG. 8, in an example use case 300 for operation of the security system 20, the authorized user forgets that the pseudo code setting is enabled, and fails to enter the proper pseudo code (step 302). In this use case, the authorized user fails to enter the proper pseudo code into the pseudo code screen 60 a multiple of times, for example, twice (step 304). In response, the security device 22 sends an SMS to the authorized device 24 to provide information such as a status of the security device 22 which may, for example, remind the authorized user that the pseudo code setting is enabled (step 306). This SMS may contain information to facilitate entry of the proper pseudo code (step 308) by the authorized user.

Should the authorized user fail to enter the proper pseudo code into the pseudo code screen 60 a multiple of times (step 304) then again fails to enter the proper pseudo code in response to the SMS reminder (step 308), the system 20 sends an SMS to the authorized device 24 with a temporary access code (step 310).

Figure 9:
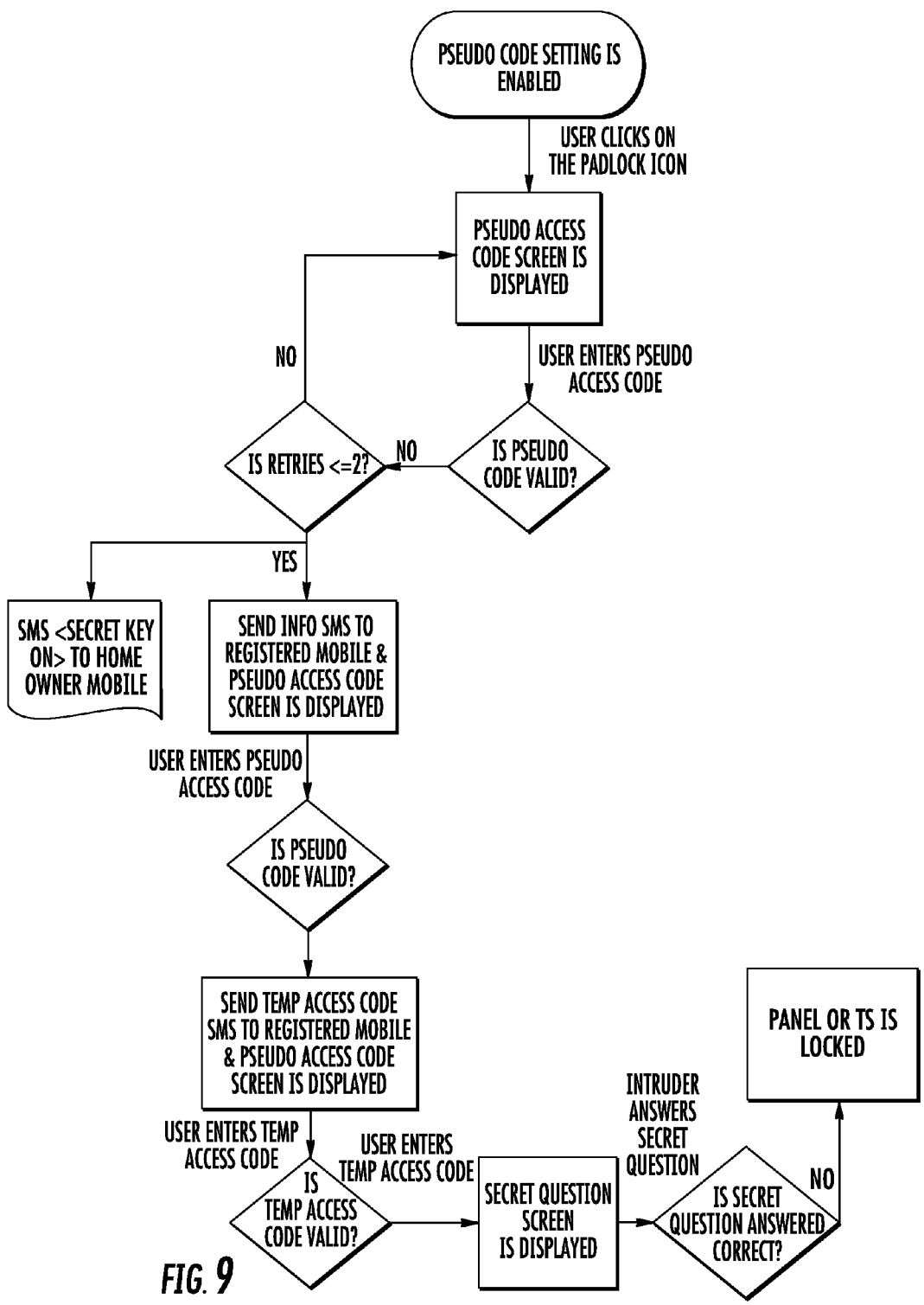
FIG. 9 is a block diagram for an operational use case of the security system according to one disclosed non-limiting embodiment.

Next, in response to proper entry of the temporary access code (step 312), a secret question screen is displayed (step 314). The secret question may, for example, be mother's maiden name, city of birth, etc., that was previously set by the authorized user (step 316). Proper entry of the answer to the secret question by the authorized user (step 318), displays the access code screen 62 (step 320) for entry of the access code (step 322) to then disarm the system (step 324). Should an intruder who has stolen the mobile device 24 reach this step, the secrete question prevents intruder access and can then lock the security device for a desired time period (FIG. 9).

Figure 10:
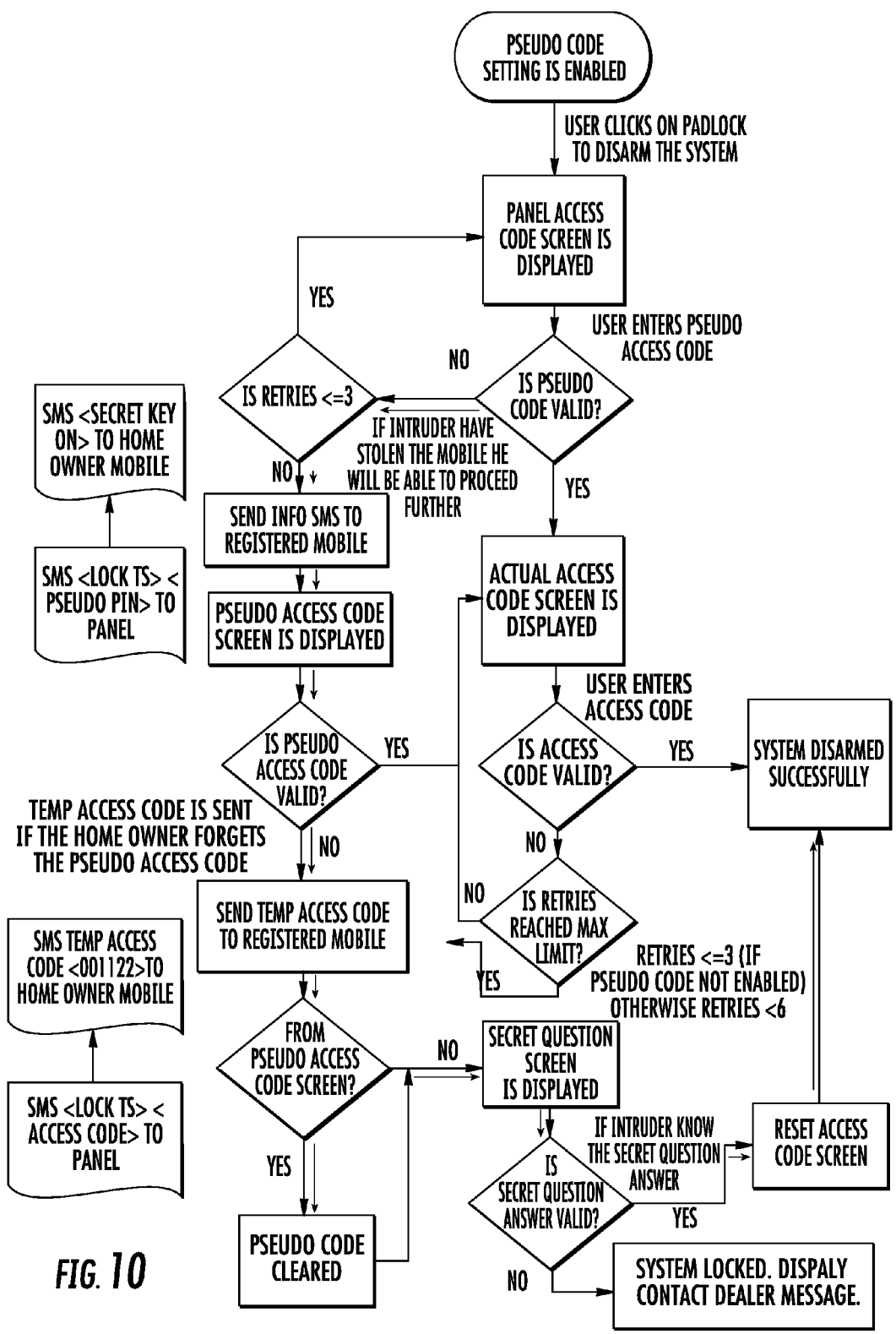
FIG. 10 is a block diagram illustrating overall operation of the security system according one disclosed non-limiting embodiment.

The real-time SMS notification facilitates increased security at no extra cost and readily handles brute force attack and access code cracking. The real-time SMS notification to the authorized user and the pseudo code facilitates more timely control via SMS based communication with the control panel 22 (FIG. 10). Further, installer back end support is eliminated via SMS based communication for access code recovery to result in cost savings and an efficient method of administering user access code in an essentially self-contained manner.

The elements disclosed and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, dynamically loaded or updated modules, or any combination of these, and all such implementations may be within the scope of the present disclosure.

It should be appreciated that like reference numerals identify corresponding or similar elements throughout the several drawings. It should also be appreciated that although a particular component arrangement is disclosed in the illustrated embodiment, other arrangements will benefit herefrom.

Although the different non-limiting embodiments have specific illustrated components, the embodiments are not limited to those particular combinations. It is possible to use some of the components or features from any of the non-limiting embodiments in combination with features or components from any of the other non-limiting embodiments.

Although particular step sequences are shown, disclosed, and claimed, it should be appreciated that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically disclosed. For that reason the appended claims should be studied to determine true scope and content.

What is claimed is:

1. A security system, comprising: a security device operable to display a pseudo access code screen prior to display of an actual access code screen, the security device requiring with at least two factors of authentication to access the actual access code screen from the pseudo access code screen, wherein the pseudo access code screen is identical to the actual access code screen and entry of the access code to the actual access code screen is required to disarm the security system.

2. The system as recited in claim 1, wherein at least one factor of authentication of the at least two factors of authentication includes a proximity between the security device and an authorized mobile device.

3. The system as recited in claim 1, wherein at least one factor of authentication of the at least two factors of authentication includes a communication between the security device and an authorized mobile device.

4. The system as recited in claim 3, wherein the communication between the security device and the authorized mobile device includes a fingerprint to the authorized mobile device.

5. The system as recited in claim 3, wherein the communication between the security device and the authorized mobile device includes a voiceprint to the authorized mobile device.

6. The system as recited in claim 1, wherein at least one factor of authentication of the at least two factors of authentication includes a Short Message Service (SMS) between the security device and an authorized mobile device.

7. The system as recited in claim 1, wherein at least one factor of authentication of the at least two factors of authentication includes a Short Message Service (SMS) from an authorized mobile device to a security device.

8. The system as recited in claim 1, wherein at least one factor of authentication of the at least two factors of authentication includes display of the pseudo access code screen prior to display of an actual access code screen.

9. The system as recited in claim 8, wherein the pseudo access code screen requires entry of a pseudo code for display of the actual access code screen.

10. The system as recited in claim 9, wherein the pseudo code has a different digit count compared to the access code.

11. The system as recited in claim 1, wherein entry of an access code into the pseudo access code screen will result in an access failure.

12. The system as recited in claim 1, wherein entry of a proper access code for the actual access code screen into the pseudo access code screen will result in an access failure.

13. A method of operating a security system, the method comprising: displaying a pseudo access code screen on a security device prior to display of an actual access code screen on the security device, the pseudo access code screen identical to the actual access code screen; and receiving the access code to the actual access code screen to disarm the security system.

14. The method as recited in claim 13, further comprising displaying the actual access code screen in response to an authorized mobile device being within a predefined proximity to a security device.

15. The method as recited in claim 13, further comprising displaying the actual access code screen in response to a Short Message Service (SMS) from an authorized mobile device.

16. The method as recited in claim 13, further comprising requiring entering a pseudo code to the pseudo access code screen to display of the actual access code screen.

17. The method as recited in claim 16, wherein the pseudo code has a different digit number compared to the access code.

18. The method as recited in claim 13, further comprising communicating with an authorized mobile device or a central monitoring station in response to a predetermined number of incorrect entries into the pseudo access code screen.

19. The method as recited in claim 18, further comprising communicating with the authorized mobile device or the central monitoring station via Short Message Service (SMS).

20. The method as recited in claim 18, further comprising communicating information related to the security device to the authorized mobile device.

21. The method as recited in claim 18, further comprising communicating a temporary access code to the authorized mobile device.

22. The method as recited in claim 21, further comprising displaying a secret question screen in response to entry of the temporary access code.

23. The method as recited in claim 22, further comprising disabling the security device in response to an incorrect entry to the secret question screen.

24. The method as recited in claim 13, further comprising displaying the actual access code screen in response to an authorized mobile device being within a predefined proximity to a security device, the predefined proximity determined by a global positioning system (GPS).

25. The method as recited in claim 13, further comprising displaying the actual access code screen in response to an authorized mobile device being within a predefined proximity to a security device, the predefined proximity determined by triangulation.

26. The method as recited in claim 13, further comprising displaying the actual access code screen in response to an authorized mobile device being within a predefined proximity to a security device, the predefined proximity determined from a periodic poll from the mobile device.

27. The method as recited in claim 13, further comprising displaying the actual access code screen in response to an authorized mobile device being within a predefined proximity to a security device, then displaying the actual access code screen in response to an extensible markup language-based communication from the mobile device.

28. The method as recited in claim 13, further comprising displaying the pseudo access code screen and the actual access code screen on a touchscreen of the security device.

29. The method as recited in claim 13, further comprising receiving at least two factors of authentication prior to permitting access to the actual access code screen from the pseudo access code screen.

30. The method as recited in claim 13, wherein the displaying includes displaying the pseudo access code screen to be identical to the actual access code screen.

31. A security system, comprising: a security device operable to display a pseudo access code screen prior to display of an actual access code screen, the pseudo code screen identical to the actual access code screen, the security device requiring at least two factors of authentication to access the actual access code screen from the pseudo access code screen, wherein entry of the access code to the actual access code screen is required to disarm the security system.

* * * * *